Dec. 18, 1923.
G. C. HENNE
ATTACHABLE RAIN SHIELD FOR AUTOMOBILES
Filed June 21, 1922     2 Sheets-Sheet 1
1,478,279
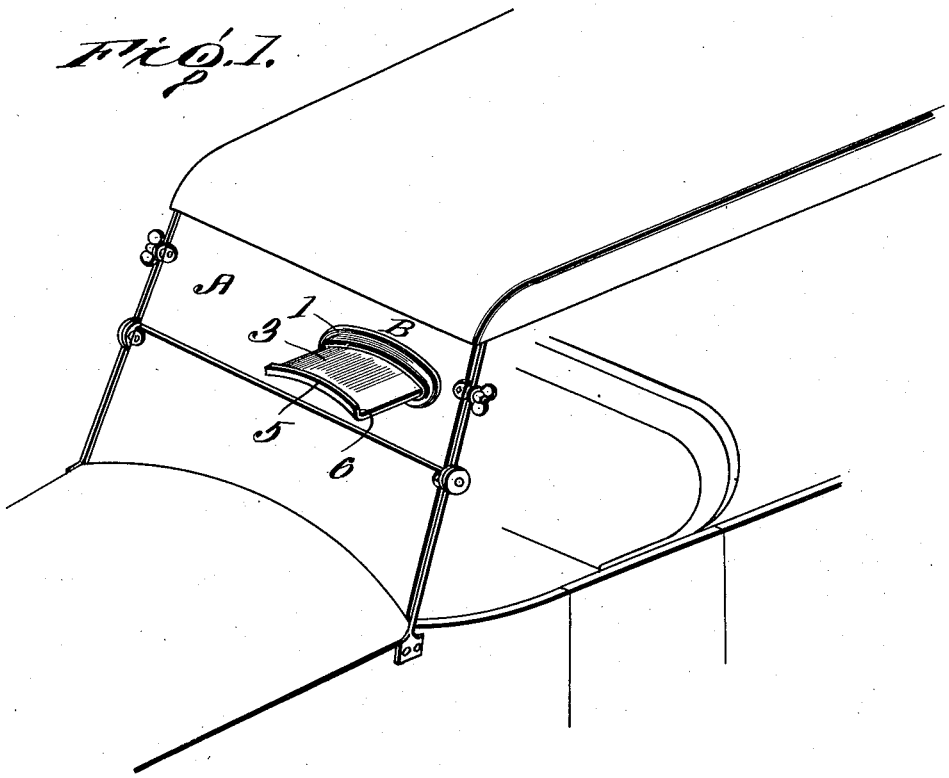
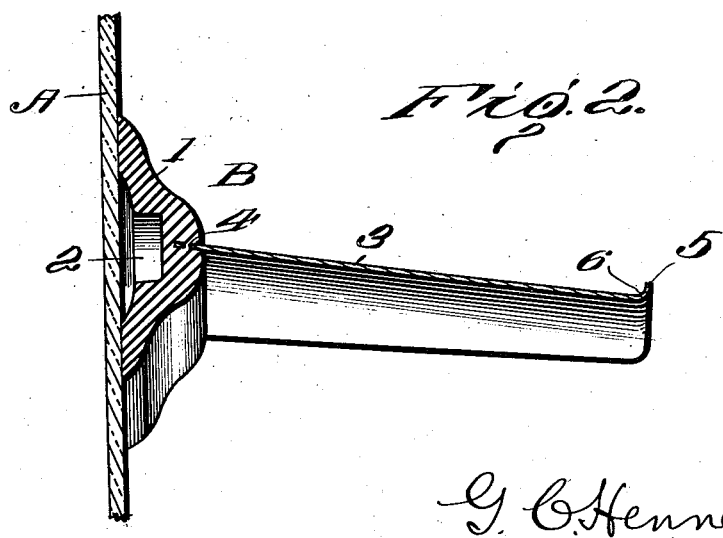
Inventor
G. C. Henne,
By A. S. Pattison,
Attorney

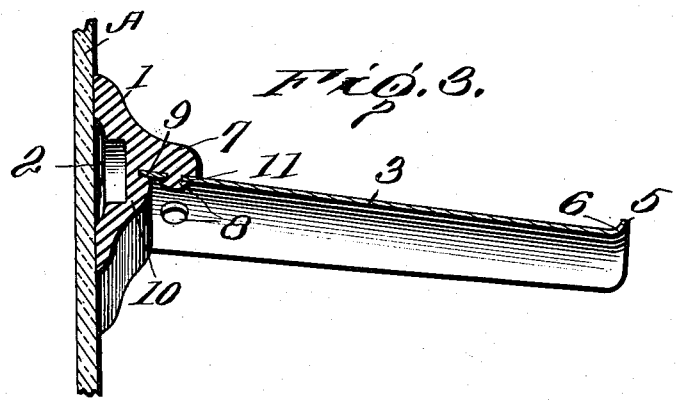
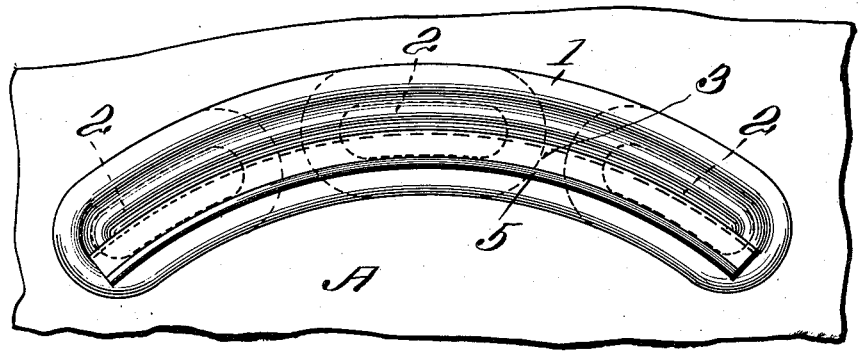
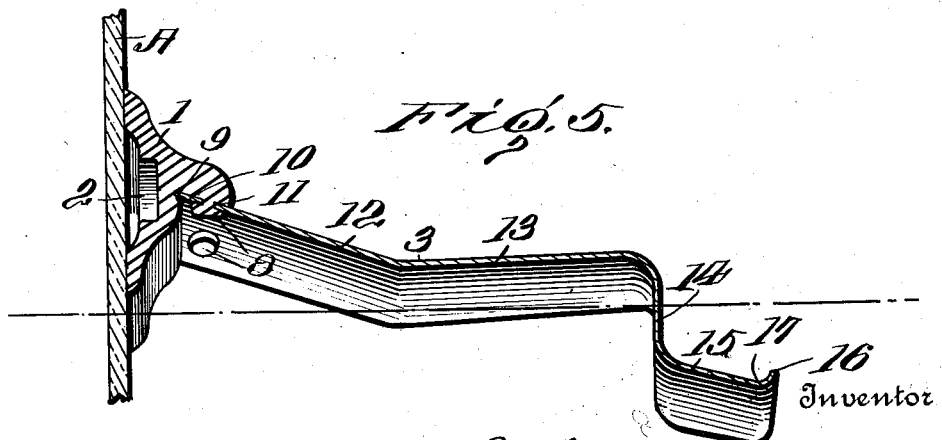

Patented Dec. 18, 1923.

1,478,279

UNITED STATES PATENT OFFICE.

GEORGE CALVIN HENNE, OF HERRIN, ILLINOIS.

ATTACHABLE RAIN SHIELD FOR AUTOMOBILES.

Application filed June 21, 1922. Serial No. 568,887.

*To all whom it may concern:*

Be it known that I, GEORGE C. HENNE, a citizen of the United States, residing at Herrin, in the county of Williamson and State of Illinois, have invented certain new and useful Improvements in Attachable Rain Shields for Automobiles, of which the following is a specification, reference being had therein to the accompanying drawing.

This invention relates to improvements in attachable rain shields for automobiles, and which may be constructed to act as a non-glare shield to protect the driver from the glare of the headlights of approaching machines as well as to prevent the accumulation of rain on the glass windshield of the automobile in the line of vision of the driver.

The primary object of my invention is to provide a simple and cheap rain or non-glare shield, which is readily, easily and quickly attached to the glass windshield of an automobile at any desired point to protect that part of the glass windshield in the line of vision of the driver from rain and from the glare of the headlights of an approaching machine, and to be as readily and quickly removed from the glass windshield when its use is not required or desired.

A further object of my present invention is to provide a simple and cheap rain or non-glare shield for the windshield of automobiles, which is composed of a flexible transparent shield portion, such as celluloid having a rubber base provided with open suction pockets adapted to be attached to the glass windshield by suction at any desired point thereon.

Further objects of the construction of my present invention will appear from the description hereinafter.

In the accompanying drawings:

Figure 1 is a perspective view of the windshield portion of an automobile, showing my improved attachable and detachable rain or non-glare shield in position thereon.

Fig. 2 is a longitudinal central sectional view of my improved shield, showing it in position on the glass windshield.

Fig. 3, is a view similar to Fig. 2, showing a modified manner of attaching the celluloid shield portion to the rubber base.

Fig. 4 is a front view of my improved shield, showing it in position on a glass windshield.

Fig. 5 is a longitudinal central sectional view, showing a modification in the construction of my shield which particularly adapts it to act as a non-glare shield, as well as a rain shield.

Referring now to the drawings, A is the upper portion or panel of a glass windshield for an automobile, which may be of any desired construction so far as my invention is concerned. B is my improved shield constructed as hereinafter described, and adapted to be applied to any desired part of the windshield of an automobile.

In carrying out my present invention, I provide a flexible rubber base portion 1, which has its outer face provided with a suitable number of suction recesses 2, by which the base 1 is adapted to be attached to the glass windshield A, in a manner well understood. A forwardly projecting shield portion 3 has its inner edge connected with the base 1, in any desired manner. This shield portion 3, is composed preferably of flexible transparent material, such as celluloid. In Fig. 2, I show the inner edge of the shield portion 3, attached to the base 1, by vulcanizing the rubber base 1 through opening 4 in the inner edge of the shield 3. This shield portion 3 and also the base 1, are preferably curvilinear in cross-section, as clearly shown in Figs. 1 and 4, and the outer edge of the shield portion 3 has an upwardly turned lip 5, which forms a gutter or valley 6, so that the water flowing on the shield will not rush over the front edge of the shield portion 3, but will be caused to run laterally at its outer end and fall off at its opposite edges, which will more effectively prevent the accumulation of the rain on the glass shield under the shield 3.

In Fig. 3, I show a slight modification in the manner of attaching the inner edge of the shield portion 3 to the rubber suction base 1. This modification consists in providing the base portion 1 with an overhanging lip 7, and vulcanizing or casting on the underside of this lip 7 a plurality of button head-shaped projections 8 and a groove 9, which extends longitudinal the rubber base 1. By this construction, the shield portion 3 can be attached to the rubber base 1 after the latter has been made, by inserting the inner edge 10 of the shield portion 3 in the curved groove 9, and then forcing the button head-shaped portions 8 through suitable openings 11, formed through the inner edge of the shield portion 3.

I desire it to be understood that the transparent shield portion 3 may be made of a suitable color, such as amber, for instance, so that it will act, to some extent to counteract the glare from the head-lights of approaching automobiles in the form shown in Figs. 1, 2, 3 and 4.

However, my improved attachable and detachable shield may be constructed to positively act as a non-glare shield by constructing the shield portion 3, as shown in Fig. 5. The inner edge of the shield portion 3 may be attached to the base 1, in any desired manner, but, as shown in Fig. 5, it is attached in the manner shown in Fig. 3, which has already been described. In Fig. 5 the shield portion 3, has a portion 12, which extends forwardly and slightly downward from the base 1, and from that point, outward is a horizontal portion 13, terminating in a downwardly extending and approximately vertical portion 14, with an outwardly and downwardly extending extremity 15, forming a lip 16, and a gutter or valley 17, acting in the manner of a valley 6, heretofore described. By reason of this construction, the shield will be so positioned on the glass shield that the perpendicular or vertical portion 14 is positioned in the line of vision of the driver, so that it shields him from the glare of approaching automobiles, and at the same time forms a rainshield in the manner above described.

I do not limit myself to the exact construction here shown, because it may be varied in certain limits without departing from the spirit and scope of my invention.

Having thus described my invention what I claim and desire to secure by Letters Patent is:

1. A combined rain and vision shield comprising a rubber base having formed integrally in one side thereof a series of independent suction cup recesses adapting it to be attached to a wind shield at any desired point, the other side of the base provided with a series of button-like projections, and a shield having a series of openings adjacent one of its ends for engagement with said base projections, whereby the shield is detachable from the base.

2. A combined rain and vision shield of the character described, comprising a shield portion and a base for attaching it to a wind shield, the shield portion provided with an approximately horizontal extending portion having at its end a vertically downwardly turned colored portion to form the shield vision, the vertical portion of the shield terminating in a forwardly projecting portion having at its outer end a gutter, whereby the forwardly projecting portions form a shield whereby the shield is so constructed as to protect that portion of the wind shield which is in a line with the vertical vision portion of the shield, for the purpose described.

3. A combined rain and vision shield of the character described, comprising a flexible rubber base having formed in one side thereof and integral therewith a series of suction cup recesses adapting it to be attached to a wind shield at any desired point, the opposite side of the base being provided with an over-hanging lip having a series of button like projections, and the said projections of the base adapted for engagement with a shield whereby the shield is readily attached and detached from the base.

4. A combined rain and vision shield of the character described, comprising a shield portion and means for attaching it to a wind shield, the shield portion provided with an approximately horizontal extending portion having at its end a vertically downwardly turned colored portion to form the shield vision, the vertical portion of the shield terminating in a forwardly projecting portion, whereby the forwardly projecting portion forms a shield whereby the shield is so constructed as to protect that portion of the wind shield which is in a line with the vertical vision portion of the shield, for the purpose described.

In testimony whereof I hereunto affix my signature.

GEORGE CALVIN HENNE.